(No Model.) 2 Sheets—Sheet 1.
C. H. FOSS.
CLEANER FOR CARDING CYLINDERS.
No. 407,189. Patented July 16, 1889.
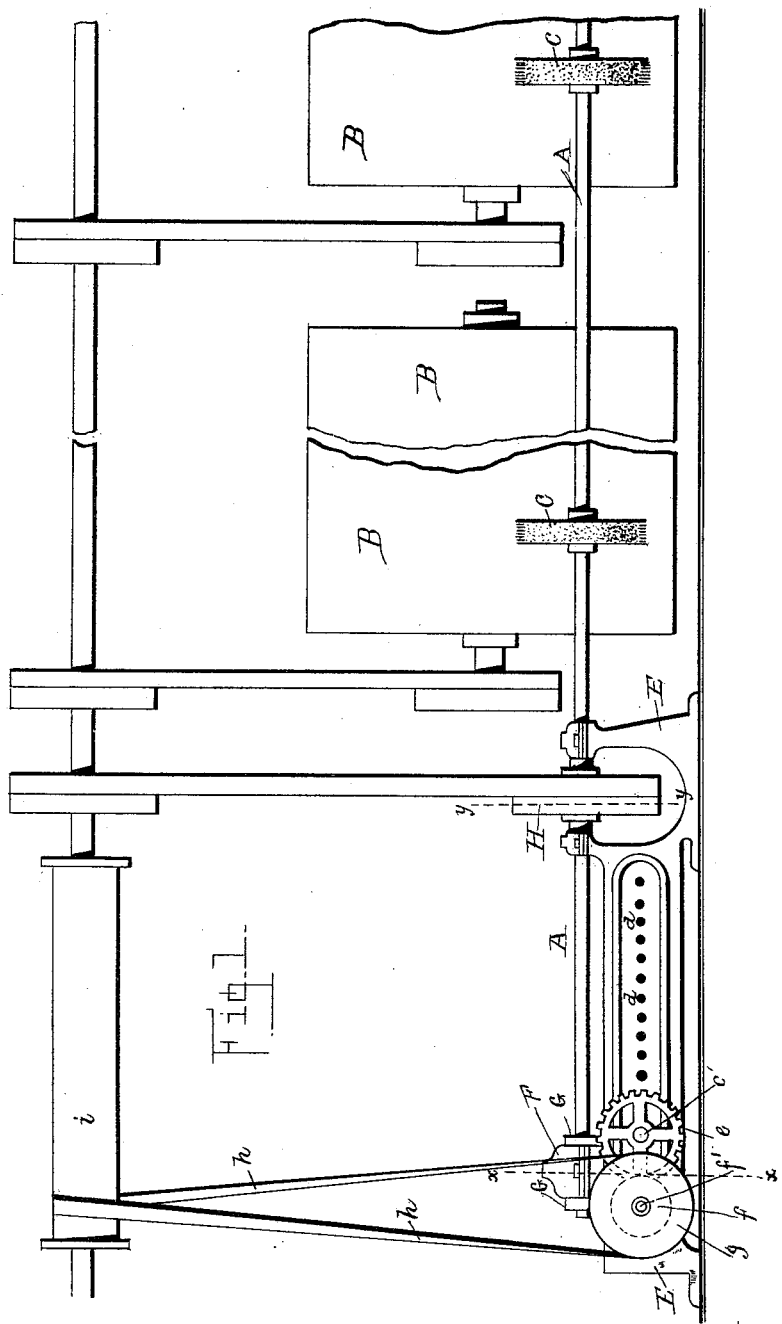
Witnesses:
Will E. Aughinbaugh
Ewell A. Dick
Inventor:
Chas. H. Foss
By Marcellus Bailey
his Atty

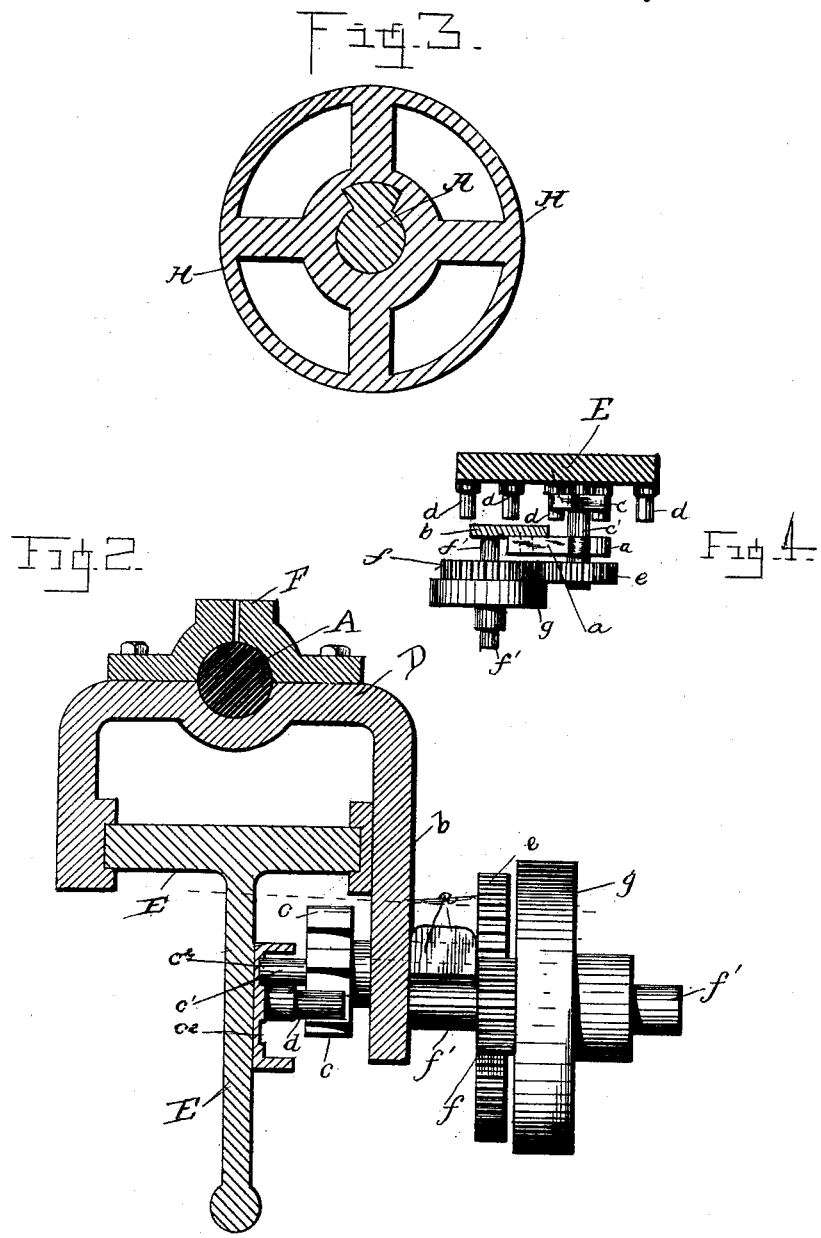

UNITED STATES PATENT OFFICE.

CHARLES H. FOSS, OF TEWKSBURY, MASSACHUSETTS.

CLEANER FOR CARDING-CYLINDERS.

SPECIFICATION forming part of Letters Patent No. 407,189, dated July 16, 1889.

Application filed November 16, 1888. Serial No. 291,074. (No model.)

*To all whom it may concern:*

Be it known that I, CHARLES H. FOSS, of Tewksbury, in the county of Middlesex, State of Massachusetts, have invented certain new and useful Improvements in Cleaners for Carding-Cylinders, of which the following is a specification.

The object of this invention is to provide a cleaner for automatically removing or stripping the adhering cotton from carding-cylinders, the same being adapted to have a rotary and a longitudinal traversing movement, with its teeth intersecting those of the carding-cylinder; and to these ends the nature of the invention consists of a traveling shaft carrying toothed stripping or cleaning wheels disposed contiguously to the line of carding-cylinders, and which shaft receives its longitudinal movement from a carriage driven or moved by a mangle rack or pinion, the rotary motion being imparted to the said shaft through a belt-pulley splined thereto, all substantially as hereinafter more fully pointed out and claimed.

In the drawings, Figure 1 is a view in side elevation disclosing my invention as applied for use. Fig. 2 is an enlarged sectional view taken on the line $x\ x$ of Fig. 1. Fig. 3 is a similar section taken on the line $y\ y$ of the same figure, showing the splined connection between the traveling shaft and its driving-pulley. Fig. 4 is a detail.

In the embodiment of my invention I suitably dispose alongside of a line of carding-cylinders B B, in a plane below the centers thereof, a shaft A, supported upon suitable bearings. Upon this shaft are secured toothed wheels C C, one for each carding-cylinder B, and arranged so as to travel with its shaft, as will be explained farther on, in a line parallel with the cylinders, from end to end thereof, while at the same time having a rotary motion. The wheels C are armed upon their peripheries with card-clothing, the teeth of which are straight, or nearly so, and intersect the teeth of the combs or carding-cylinders, whereby the adhering cotton of the latter will be removed or stripped therefrom by the action of the former, the speed of the toothed wheels being about thirty per cent. greater than that of the carding-cylinders or combs.

D is the traversing head or carriage, which is mounted to travel upon a support or table E, bolted, it may be, to the floor or to the base of the machine. To this carriage or head is secured, in any suitable way, a box F, within which bears and is carried the shaft A, near its extreme inner end. The shaft A is confined to the box F of the head or carriage D against longitudinal displacement by means of collars G G, held by thumb or other screws to said shaft at the end of the box.

To a pendant $b$, at one end of the carriage D, is pivoted an arm or bar $a$, in the forward end of which is journaled the shaft $c'$ of a pinion $c$, say, of six (more or less) teeth, which engage with a mangle-rack $d$, whereby motion is imparted to the traversing head or carriage, through which in turn a longitudinal traveling movement is communicated to the shaft A, for the purpose aforesaid. The inner end of the shaft $c'$ is received in a guiding slot or way $c^2$ of the rack-frame, the latter being bolted to the table E. Upon the same shaft $c'$, bearing the pinion $c$, is a second pinion $e$, but of the common form, which gears with and is driven by a pinion $f$ on a stud or shaft $f'$, projecting from the pendant $b$ of the carriage E, and also carrying a pulley or band-wheel $g$. A belt $h$ encompasses the pulley or wheel $g$ and a cylinder or drum $i$, whose shaft is suitably driven and journaled in overhead or elevated hangers or boxing.

It will be observed that simultaneously with the traversing of the rack $d$ by the pinion $c$ the belt $h$ will traverse the cylinder, this being readily permitted by the rotation of the cylinder synchronously with the traveling motion thus imparted to the carriage. To shaft A is applied a driving-pulley H, as also a loose pulley, which are splined thereto, to effect the driving of the shaft, while at the same time permitting the latter to slide therethrough. This contrivance, it will therefore be seen, provides for the automatic stripping or removal of the cotton from carding cylinders or combs, the same also being effected in an expeditious and thorough manner, thus avoiding the tedious, slow, and laborious method as heretofore practiced of removing the same by hand.

Having thus fully described my invention, what I claim as new and of my own invention, and desire to secure by Letters Patent, is—

1. In mechanism for stripping carding cylinders or combs, the combination, with the rotary shaft carrying toothed wheels, of the carriage applied to said shaft and having a mangle-rack and pinion-actuating mechanism, substantially as and for the purposes hereinbefore set forth.

2. In mechanism for stripping carding cylinders or combs, the combination, with the traveling shaft, the toothed wheels on said shaft, and the carriage or head having a pinion, of the table having a rack engaging said pinion, a guiding slot or way receiving one end of the shaft of said pinion, and driving mechanism for said pinion, substantially as and for the purpose set forth.

3. The combination of the traveling shaft, the stripping-wheels thereon, the shaft-carriage D, provided with mangle-pinion c, pinions e f, and pulley or wheel g, the driving belt and cylinder for said pulley g, and the mangle-rack d and its supporting-frame, substantially as and for the purposes hereinbefore set forth.

4. In a mechanism for stripping carding cylinders or combs, the combination of the traversing head or carriage carrying the rotary traveling shaft, the toothed or card-clothing-armed wheels arranged upon said shaft alongside of the carding cylinders or combs, the driving-pulley for imparting rotary motion to said shaft, having a splined connection with the latter, the carriage-supporting table, the mangle-rack and its engaging-pinion applied to the carriage-supporting table and the carriage, respectively, the intergearing pinions, one being on the shaft of the aforesaid pinion, the pulley or wheel upon the shaft of the other of said pinions, and the driving belt and cylinder for said wheel, substantially as specified.

In testimony whereof I have hereunto set my hand this 10th day of November, 1888.

CHARLES H. FOSS.

Witnesses:
GEORGE W. FOSTER,
EDWARD F. ABBOTT.